United States Patent
Schwab

(10) Patent No.: US 10,678,519 B2
(45) Date of Patent: Jun. 9, 2020

(54) CODE GENERATION FOR ISOMORPHIC DATA FETCHING

(71) Applicant: COURSERA INC., Mountain View, CA (US)

(72) Inventor: Benjamin Schwab, San Francisco, CA (US)

(73) Assignee: COURSERA, INC., Mountain View, CA (US)

(*) Notice: Subject to any disclaimer, the term of this patent is extended or adjusted under 35 U.S.C. 154(b) by 0 days.

(21) Appl. No.: 15/677,516

(22) Filed: Aug. 15, 2017

(65) Prior Publication Data

US 2018/0267781 A1    Sep. 20, 2018

Related U.S. Application Data

(60) Provisional application No. 62/474,008, filed on Mar. 20, 2017.

(51) Int. Cl.
*G06F 8/36* (2018.01)
*H04W 4/90* (2018.01)
*H04W 76/50* (2018.01)

(52) U.S. Cl.
CPC .......... *G06F 8/36* (2013.01); *H04W 4/90* (2018.02); *H04W 76/50* (2018.02)

(58) Field of Classification Search
CPC ........... G06F 8/36; H04W 4/90; H04W 76/50; H04W 4/22; H04W 76/007

(Continued)

(56) References Cited

U.S. PATENT DOCUMENTS

| 7,890,478 B2 * | 2/2011 | Fiedler | G06F 8/36 |
| | | | 707/694 |
| 2004/0240408 A1 * | 12/2004 | Gur | G06F 8/61 |
| | | | 370/328 |

(Continued)

OTHER PUBLICATIONS

De Lucia et al, "Generating Applications directly on the Mobile Device an Empirical Evaluation", [Online], 2012, pp. 640-647, [Retrieved from internet on Feb. 22, 2020], <https://dl.acm.org/doi/abs/10.1145/2254556.2254674> (Year: 2012).*

(Continued)

*Primary Examiner* — Geoffrey R St Leger
*Assistant Examiner* — Zengpu Wei
(74) *Attorney, Agent, or Firm* — Brake Hughes Bellermann LLP

(57) ABSTRACT

Techniques are described for receiving a feature request for an application feature of a mobile application. An annotated model class may be determined that corresponds to the feature request and includes class annotations characterizing a server response object stored using an application server and including application data associated with the application feature. An annotated data contract may be determined that includes contract annotations mapping the annotated model class to the server response object and defining a persistence strategy for storing and accessing the application data at an application server and at one or more local caches of a mobile device. A request object may be used to fetch the server response object from the application server. Then, from the fetched server response object and using the class annotations of the annotated model class, a runtime application data model may be generated that is executable by the mobile application platform.

16 Claims, 12 Drawing Sheets

(58) Field of Classification Search
USPC .......................................................... 717/106
See application file for complete search history.

(56) References Cited

U.S. PATENT DOCUMENTS

| | | | | |
|---|---|---|---|---|
| 2014/0019480 | A1* | 1/2014 | Rychikhin | G06F 8/30 707/770 |
| 2014/0101635 | A1* | 4/2014 | Hoffmann | G06F 8/30 717/106 |
| 2014/0269284 | A1* | 9/2014 | Amanna, III | H04L 5/0037 370/230.1 |
| 2014/0297713 | A1* | 10/2014 | Meigen | G06F 8/20 709/203 |
| 2015/0169293 | A1* | 6/2015 | Bozek | H04L 67/10 717/106 |
| 2017/0139824 | A1* | 5/2017 | Dragoljevic | G06F 12/0253 |

OTHER PUBLICATIONS

Yau et al, "An Approach to Distributed Component-based Real-time Application Software Development", [Online], 1998, pp. 1-9, [Retrieved from internet on Feb. 22, 2020], <https://ieeexplore.ieee.org/stamp/stamp.jsp?tp=&arnumber=666798> (Year: 1998).*

Buck et al, "An API for Runtime Code Patching", [Online], 2000, pp. 317-329, [Retrieved from internet on Feb. 22, 2020], <https://journals.sagepub.com/doi/pdf/10.1177/109434200001400404> (Year: 2000).*

"Naptime", (http://web.archive.org/web/20161105222326/http://coursera.github.io/naptime/gettingstarted/),, Nov. 5, 2016, 7 pages.

Harter, Ryan, "An Introduction to AutoValue", (http://ryanharter.com/blog/2016/03/22/autovalue/), Mar. 22, 2016, 15 pages.

Kapahi, Shivani, "Android Adapter Tutorial: What Are Adapters in Android", Edureka! Blog (https://www.edureka.co/blog/what-are-adapters-in-android/), Mar. 19, 2013, 10 pages.

Salonen, Olli, "Tech Pick of the Week: Rx for .NET and RxJava for Android", Futurice (http://futurice.com/blog/tech-pick-of-the-week-rx-for-net-and-rxjava-for-android), Oct. 22, 2013, 7 pages.

Sechan, Gabe, "Disk Caching on Android", Gabe Sechan Software Blog (http://gabesechansoftware.com/disk-cacheing-on-android/), Mar. 6, 2016, 11 pages.

Vogel, Lars, "Using the OkHttp library for HTTP requests—Tutorial—Tutorial", Vogella (http://www.vogella.com/tutorials/JavaLibrary-OkHttp/article.html_, Jun. 25, 2016, 5 pages.

* cited by examiner

FIG. 5

```
506                                                                              502                          504
508                                                                                                           500
@autoValue
public abstract class onboardingRecommendationSet(                                elements: {                 -Linked: {              527
  public abstract string id();                510                                 -{                          + userInterests.v1: [...],
  public abstract List<OnboardingRecommendationSection> results();  511           userInterestId: "vxMIYG5DEeav9xIcSLpDLQ", 525      + courses.v1: [...],
  @SerializedName("courses.v1")                                                   id: "kadMjpWlEea86A7VcjRI6A",    518              + partners.v1: [...]
  @NaptimeInclude(resource="courses.v1",                                          - results" [                                       +!onDemandSpecializations.v1: [...]   513
  bindType=NaptimeBindType.ADOPT_LINKED_BY_NAME)                                  -{                                                }
  @NaptimeMap(keyField="id")                                                        label: Management Consultant",
  public abstract Map<String, OnboardingRecommendationLinkedCourse>CourseMap();   -recommendations: {                                - userInterests.v1: [
  @SerializedName("onDemandSpecializations.v1")   514                             -{                                                 -{
  @NaptimeInclude(resource="onDemandSpecialization.v1",bindType=NaptimeBindType     score: 0.43934908710.1782,                         - preferredOccupations: [
  .ADOPT_LINKED_BY_NAME)                                                            productId: "Vsgr9J9aEeVj3Q6iLfN-8Q",              -{
  @NaptimeMap(keyField="id")                                                        productType "SPECIALIZATION"                         typeName: "OccupationId",
  public abstract Map<String, OnboardingRecommendationLinkedSpecialization>       },                                                     - definition: {
  specializationMap();                                                            -{                                                     Id: "management-consultant"
                                                                                    score: 0.2564606011.3856,                             }
  @nullable                                                                         productId: "yEVwdp0mEew7xQ61-xJMQQ",                },
  @SerializedName("userInterestId")   520           522                             productType "SPECIALIZATION"                        Id: "vxM1YH5DEeav9xIcSLpDLQ",
  @NaptimeInclude(resource="userInterest.v1", bindType=NaptimeBindType.          },                                                     preferredDomains: [],          505
  LINK_OBJECT_BY_ID, resourceKey="id")                      524                   -{                                                   intention: "BEGIN_CAREER"
  public abstract UserInterests userInterests();                                    score: 0.251135024242539,                         },
                                                                                    productId: "AQ719YHLEeVWVhJkLv2LYQ",
  public static OnboardingRecommendationSet create(String id,                       productType "SPECIALIZATION"
        List<OnboardingRecommendationSection>results,                             },
        Map<String, OnboardingRecommendationLinkedCourse> courseMap,              -{
523     Map<String, OnboardingRecommendationLinkedSpecialization>specialisationMap) score: 0.2245793602.92932,
        UserInterests userInterests) {             528                              productId: "qOEn30bTEeVMNHw5V7PydcQ",
  return new AutoValue_OnboardingRecommendationSet(id, results, CourseMap,         productType "SPECIALIZATION"
        specializationMap, userInterests);                                        },
  }                                                                               -{
  public static naptimeDeserializers<OnboardingRecommendationSet>naptimeDeserializers() score: 0.175431537025,
    return AutoValue_OnboardingRecommendationSet.naptimeDeserializers;              productId: "yQX-97EeWV-A60xpvjnw",
  }                                                                                 productType "SPECIALIZATION"
  public static TypeAdapter<OnboardingRecommendationSet> typeAdapter(Gson gson) { },
    return new AutoValue_OnboardingRecommendationSet.GsonTypeAdapter(gson);  530
  }
}                                        532
```

```
public class OnboardingDataSource { private OnboardinghTTPService onboardingHTTPServuce;
    private OnboardinghDataContract onboardingDataContract;
    Private CourseraDataFramework dataFramework;

public OnboardingDataSource(OnboardingHTTPService onboardingHTTPService,
                                OnboardingDataContract dataContract,
                                CourserDataFramework dataFramewrok) {
        this.onboardinghTTPService = onboardingHTTPService;
        this.onboardingDataContract = dataContract
        this.dataFramework = dataFramework;
    } public OnboardingDataSource() {
        this(CourserDataFrameworkModule.provideRetrofitAdapter().createPostService(OnboardingHTTPService.class, false),
             new OnboardingDataContractSigned(),
             CourserDataFrameworkModule.provideDataFramework());
    } public Observable<Response> submitUserInterests(@NonNull UserInterests userInterstsBody) {
        return onboardingHTTPService.submitOnboardingUserInterests(userInterestsBody);
    } public Observable<Response> updaeUserInterests(@NonNull String userInterestsId, @NonNull UserInterests userInterstsBody) {
        return onboardingHTTPService.supdateOnboardingUserinterests(userInterestsId, userInterestsBody);
    } public Observable<List>OnboardingRecommendationSet>>getUserInterestREcommendations(){
        return dataFramework.getData(onboardingDatacontract.getUserInterestRecommendations().build(),
                                     new TypeToken<List<OnboardingRecommendationSet>>() {});
    } public Observable<List>Occupation>>getHighDemandOccupations() {
        final DSRequest request = onboardingDataContract.getHighDemandOccupations().build();
        return dataFramework.getData(request, new TypeToken<List<Occupation>>() {});
    } public void invalidateOnboardingUrls() { dataFramework.invalidateGroups(DataSourceGroupKeys.ONBOARDING_COMPLETED_DEPENDENCY); }
}
```

FIG. 7

```
@OntoService(Processor.class)
public class DataSourceProcessor extends ErorLoogingProcessor {

@Override
    public set<String> getSupportedAnnotationTypes() {
        Set<String> supportedAnnotations = new HashSet<>();
        supportedAnnotations.add(DS_Contract.class.getCononicalname());
        return supportedAnnotations;
    }

@Override
    public SourceVersion getSupportedSourceVersion() { return SourceVersion.latestSupported(); }

@Override
    public boolean process(Set<? extends TypeElement> annotations, RoundEnvironment roundEnv) {
        DataContractModelFactory contractModelFactory = DataContractModelFactory.create(processingEnv.getMessager(),
                                                                                         processingEnv.getTypeUtils(),
                                                                                         processingEnv.getElementUtils());
        //Process each DS_Contract class.
        processingEnv.getMessager().printMessage(Diagnostic.kind.note, "CourseraCompile DS_Contract start");
        List<DataContractModel> dataContractModels = new ArrayList<>();
        for (Element annotatedElement : roundEnv.getElementsAnnotatedWith(DS_Contract.class)) {
            processinEnv.getMessager().printMessage(Diagnositc.Kind.Note, "CourseraCompile:" + annotatedelement.getSimpleName());
            Try {
                DataContractModel model =
                    contractModelFactory.parseContractModel(annotatedElement.getAnnotation(DS_Contract.class), TypeElement) annotatedElement);
                dataContractModels.add(model);
            } catch (ProcessingError error) {
                logErrorToCompilerConsole(error);
            }
        }

//Fulfill contracts by generating files.
        for (DataContractModel dataContractModel : dataContractModels) {
            fulfillContract(dataContractModel);
        }
        return false;
    } private void fulfillContract (DataContractModel model) {
        try {
            dataContractBrowser brewer = newDataContractBrewer(processingEnv.getElementUtils(),
                                                                processingEnv.getFiler(),
                                                                processingEnv.getMessager());
            brewer.brewDataContract (model);
        } catch (ProcessingError error) {
            logErrorToCompilerConsole(error);
        }
    }
```

900

904 → @Override (supportedAnnotations section)
902 → @Override (getSupportedSourceVersion)
906 → //Process each DS_Contract class
908 → //Fulfill contracts by generating files

```
/**...*/
public class DataContractMethod { public final ExecutiableElement methodElement;
    private final GetModel get;
    public final Map<String, PathModel> paths;
    public final List<QueryModel> queries;
    public final List<QueryMapModel> queryMaps;
    public final List<StaticQueryModel>staticQueryModels;
    public final boolean authenticated;
    public final PersistenceStrategy persistenceStrategy;
    public final GroupsModel groupModel;
    public final ResponseType responseType;
```

FIG. 10

```
CodeBlock.Builder urlBuildingBlock = CodeBlock.builder().addStatement("StringBuilder urlBuilder = new StringBuilder()");
UrlPathCrawler pathCrawler = new UrlPathCrawler(contractMethod.getServiceUrl());
for (UrlPathCrawler.UrlChunk chunk : pathCrawler.getUrlChunkList()) {
    // if the chunk is rawUrl, just append it
    if (chunk.isRawUrl) {
        urlBuildingsBlock.addStatement("urlBuilder.append($S)", chunk.value);
    }
    // if the chunk is a key substitution, use the corresponding variable
    else {
        PathModel pathModel = contractMethod.paths.get(chunk.value);
        If (pathModel == null) {
            throw new ProcessingError(contractMethod.methodElement, "Error in" + DS_GET.class.getSimpleName()
                + ", No" + DS_Path.class.getSimpleName() + " parameter with key "
                + chunk.value + " not found.");
        }
        urlBuildingBlock.addStatement("urlBuilder.append($L)",
                    pathModel.methodElement.getSimpleName().toString());
    }
}
methodBuilder.addCode(urlBuildingBlock.build());
```

FIG. 11

```
/* https:api2.coursera.org/api paymentWallets.v1?user=Id={}&q=findByUser&getLatest=true&fields=creditCardLastFourDigits,creditCardType,
creditCardExpiration,isValid,billingZipcode,email,paymentProcessorId */
@Override
public DSRequest.Builder getPaymentWallets(String userId) {
stringBuilder urlBuilder = new StringBuilder();
urlBuilder.append("api/paymentWallets.v1");
httpUrl.Builder httpUrlBuilder = new HttpUrl.Builder().scheme("https").host("api2.coursera.org");
httpUrl.Builder httpUrlparse(httpUrlBuilder.build().toString() + urlBuilder.toString()).newBuilder();
If (userId !=null) {
    httpUrlBuilder.addQueryParameter("userId",userId.toString());
}
httpUrlBuilder.addQueryParameter("q", "findByUser");
httpUrlBuilder.addQueryParameter("getLatest", "true");
httpUrlBuilder.addQueryParameter("fields", "creditCardLastFourDigits,creditCardType,creditCardExpiration,isValid,billingZipcode,email,
paymentProcessorId");;
String[] groups = new String[]{};
return new DSRequest.Builder(httpUrlBuilder, new PersistenceStrateggy(3, 3600000, true), groups, ResponseType.JSOW, true);
}
```

FIG. 12

CODE GENERATION FOR ISOMORPHIC DATA FETCHING

CROSS REFERENCE TO RELATED APPLICATION

This application claims priority to U.S. Provisional Application No. 62/474,008, filed Mar. 20, 2017, the disclosure of which is incorporated herein by reference in its entirety.

TECHNICAL FIELD

This description relates to application development for software applications.

BACKGROUND

Some software applications are developed for offline implementation and use, in which application data and code are stored and executed locally to a particular device, such as a mobile device. In such cases, users do not require, or depend upon, network access when using the application(s). However, offline applications are associated with a number of difficulties and challenges. For example, an application may be difficult for one or more users to upgrade or otherwise maintain, and data stored locally may be lost as a result of a malfunction, breakage, or loss of the local device.

In other scenarios, application data and code may be partially or completely stored and/or executed at a remote server, with a local device accessing the application on the server via a suitable network, such as the public Internet. Such scenarios address many of the difficulties associated with implementing applications locally. For example, a network application may be updated once at the server, for the benefit of all users. Similarly, data may be centrally stored, backed-up, and otherwise maintained. Nonetheless, to the extent that network applications rely at least in part on network access to function correctly, disruptions in network functions or access may be experienced by users as corresponding disruptions in functionality of a network application.

Accordingly, application developers often attempt to obtain many of the benefits of both application paradigms, e.g., by making some aspects of a network application available locally. In this way, for example, a user who experiences a temporary loss of network access may still continue using the network application, using the locally-stored aspects. Unfortunately, implementing applications in this manner may be difficult to optimize, time-consuming, and error-prone.

SUMMARY

The present description relates to techniques for developing and executing software applications in a manner that automates code generation. Further, the described techniques attempt to maximize an extent to which software applications may be developed and implemented using two or more platforms, such as a web-based application server and a mobile device, while minimizing repetitive, time-consuming efforts on the part of a software developer. Still further, the described techniques enable efficient selection between, and use of, one or more local memories and a network-based memory. Accordingly, the techniques enable offline use of the software application, while still offering the benefits of a network application, without requiring specific or detailed knowledge on the part of the software developer regarding memory selection techniques to obtain this result.

The details of one or more implementations are set forth in the accompa-nying drawings and the description below. Other features will be apparent from the description and drawings, and from the claims.

BRIEF DESCRIPTION OF THE DRAWINGS

FIG. 5 is a screenshot illustrating creation of an annotated model class, in accordance with FIG. 4.

FIG. 7 is a screenshot illustrating an example data source, in conjunction with FIG. 4.

FIG. 9 illustrates a screenshot illustrating code for creating an annotation processor.

FIG. 10 is a screenshot illustrating code for utilizing an annotation processor of FIG. 9 to generate a data model.

FIG. 11 is a screenshot illustrating code for generating executable code using an annotation processor of FIG. 9.

FIG. 12 illustrates a screenshot demonstrating edited code that results from the code generation process of FIG. 11.

DETAILED DESCRIPTION

Figure 1:
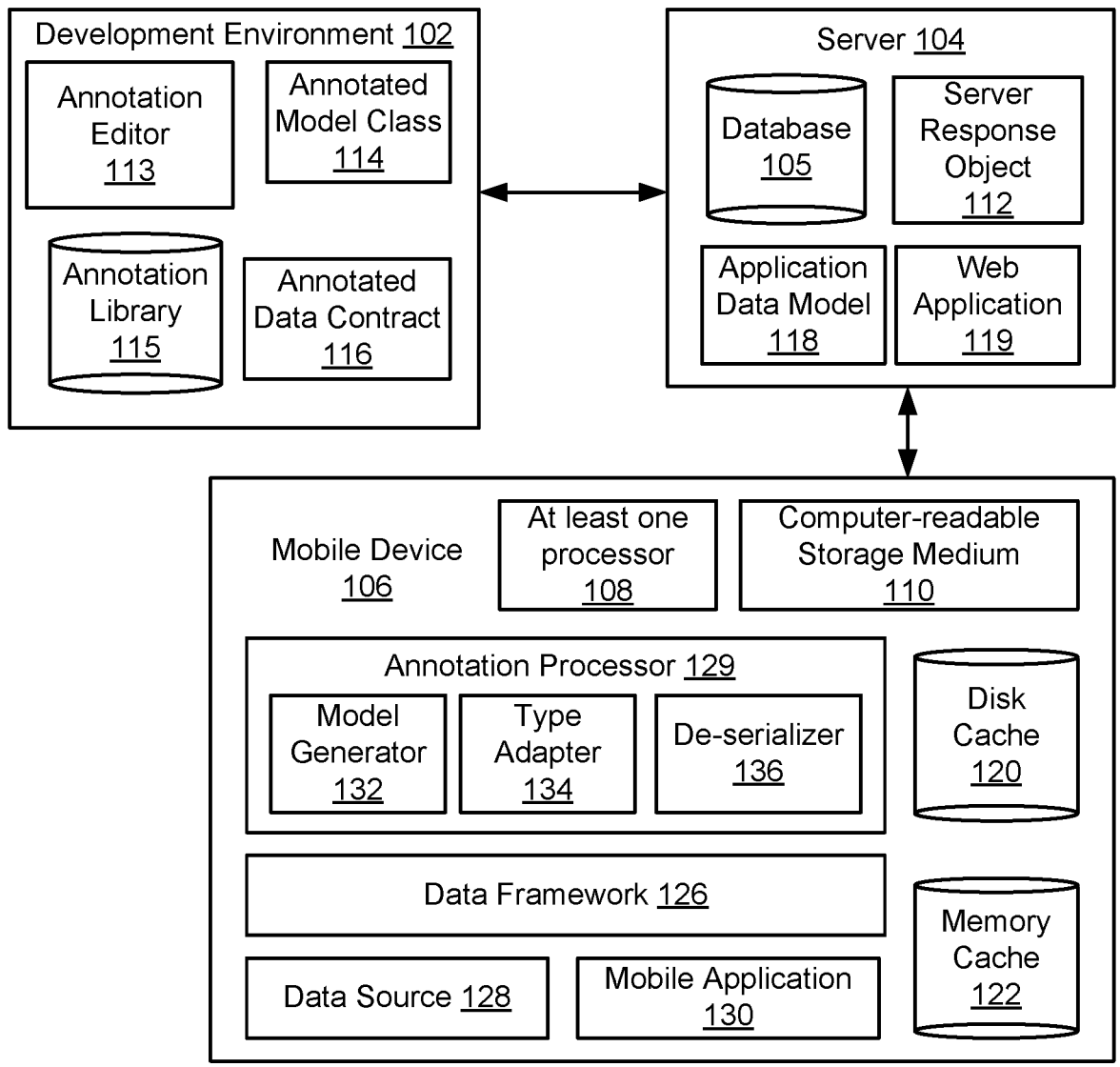
FIG. 1 is a block diagram of a system 100 for code generation for isomorphic data fetching.

FIG. 1 is a block diagram of a system 100 for code generation for isomorphic data fetching. In the example of FIG. 1, a development environment 102 enables a software developer to access a server 104 and provide a mobile device 106 with one or more mobile applications. More particularly, as described in detail below, the system 100 enables the software developer to develop applications in a highly convenient and efficient manner, while minimizing repetitive or redundant coding tasks.

Further, applications may be developed in a manner which enables storage and persistence strategies for storing data at the mobile device 106 when feasible, while ensuring that data stored by the server 104, e.g., using a database 105, is available for use when available or necessary. Still further, the application development techniques described herein enable the same application or application functionality to be provided across a plurality of platforms, such as when an application is available to be provided as a mobile application at the mobile device 106, while also being made available as a web application 119 accessed, e.g., using a desktop computer.

In the example of FIG. 1, the mobile device 106 is representative of any suitable mobile device that includes at least one processor 108 and non-transitory computer readable storage medium 110. For example, the mobile device 106 may represent a Smartphone, tablet, netbook, or notebook computing device, to name a few, non-limiting examples. The at least one processor 108 may thus represent any one or more processors operable to execute instructions stored using the non-transitory computer readable storage medium 110, which may itself represent any suitable memory available to store executable instructions.

In FIG. 1, the database 105 is assumed to store data that is related to, or used by, applications developed using the development environment 102. In the examples that follow, specific examples and scenarios are provided with respect to applications related to online learning. Of course, it will be appreciated that such examples are non-limiting, and that the features and techniques of the system 100 of FIG. 1 may be utilized in many different environments, including, e.g., business, governmental, or social media environments.

In the examples provided herein related to online learning environments, it is assumed that the database 105 stores potentially large quantities of data related to providing and facilitating online learning environments for instructors and students. For example, the database 105 may store large quantities of instructional material related to specific topics, and/or may contain potentially large quantities of data related to the administration and teaching of such educational material. Further, the database 105 may store all manner of administrative data associated with providing online education, including, e.g., data for onboarding new students, for providing certificates of completion, for enabling course selection by students, generating transcripts, and otherwise providing data necessary for instructors, students, administrators to implement the online learning environment.

In practice, then, the database 105 may be populated with large amounts of data that is anticipated to be used by a potentially large number of software applications developed using the development environment 102. Such data may be formatted and stored in a manner that is intended to facilitate a convenient and practical experience by the software developer in querying, locating, manipulating, and otherwise utilizing desired data or types of data. At the same time, the stored data may be considered to be raw data in the sense that the data need not be tied to, or particular to, any individual application. Rather, as described in detail below, data stored in the database 105 represents data that may be parsed and utilized by many different applications or types of applications, as needed. For example, data listing available educational courses may be utilized by one application in generating a course list of available courses for new students selecting therefrom, and could also be utilized by a separate application in generating a transcript or list of courses already taken by a different user.

Thus, in the simplified example of FIG. 1, the server 104 is illustrated as accessing the database 105 that is itself utilized to store a server response object 112. As will be appreciated from the above description, and from the following examples, the server response object 112 represents data that is formatted for storage within the database 105 and for use by the development environment 102, while being largely or completely agnostic to a specific application or type of application that might be developed for the purpose of using data contained within the server response object 112. In this way, for example, the server response object 112 may be utilized in the context of providing two or more features of a corresponding two or more applications being developed.

In order to facilitate the use of the server response object 112 in one or more software applications, the development environment 102 includes an annotation editor 113 that enables a software developer to generate an annotated model class 114 that corresponds to, e.g., mirrors, the server response object 112, in a manner that is specific to an application (or application feature) being developed. In other words, the annotation editor 113 enables the software developer to develop an annotated model class 114 using available class annotations stored using an annotation library 115. As described in detail below, e.g., with respect to FIG. 5, the annotated model class 114 represents an annotated model template that corresponds to, e.g., mirrors, the server response object 112, in the context of using data from the server response object 112 to provide a particular feature for an application under development. More particularly, as also described in detail below, the annotated model class 114 enables automatic code generation for executable code to be used by the application under development in providing the desired feature.

To provide a specific example, as referenced above and described in detail below, the server response object 112 may store data including a course listing of available courses, as part of a larger course selection feature (e.g., a course recommendation feature) for the application under development. In practice, as described below, the application under development may be intended for execution as a mobile application 130 on a platform of the mobile device 106, as well as a web application 119 deployed on a platform of the server 104. For example, the mobile application 130 may be deployed either using an Android platform at the mobile device 106, or as a javascript version of the web application 119 at the server 104.

Thus, the annotation editor 113 enables the software developer to add metadata to the annotated model class 114 in the form of annotations from the annotation library 115, that will enable code generation of executable code, e.g., during a compile time of the application under development, for the mobile application 130 on the mobile platform of the mobile device 106. As may thus be observed from the fact that the template of the annotated model class 114 mirrors the server response object 112 of the server 104, but in the context of the mobile device 106, the software developer is provided with an ability to develop a desired application or application feature in a manner that is highly efficient, while minimizing redundant or repetitive efforts on the part of the developer.

Further, the software developer may utilize the annotation editor 113 to access the annotation library 115 and obtain contract annotations for creating an annotated data contract 116. As described in detail below, the annotated data contract 116 generally includes metadata in the form of the contract annotations that defines, e.g., a data fetching strategy for fetching necessary data from the server 104 (e.g., a Uniform Resource Locator (URL) of necessary data), as well as a storage and persistence strategy for storing and utilizing the specified data, such as when executing the mobile application 130 at the mobile device 106.

In this way, using the annotated model class 114 and the annotated data contract 116, a runtime object, e.g., an application data model 118, may be developed, which is capable of identifying and enabling fetching of the server response object 112 and any associated data to be used, e.g., in providing an application feature of the model application 130. In the example of FIG. 1, the application data model 118 is illustrated as being stored at the database 105 in conjunction with the server 104. However, as also illustrated in FIG. 1, the mobile device 106 may include a disk cache 120, as well as a memory cache 122.

As referenced above, one or both of the disk cache 120 and the memory cache 122 may be utilized, in accordance with the storage persistence strategy defined in the annotated data contract 116, to enable efficient offline use of the fetched data associated with the server response object 112, even when the mobile device 106 is offline or experiencing intermittent network access. For example, the disk cache 120 may be used by mobile applications with a caching system, and may be configured to store data in the device's long-term persistence system, so that the data can outlive the lifecycle of the running application. The memory cache 122 may represent an in-memory cache that differs from the disk cache 120 in that it offers higher performance, but only allows data to be stored while the application is running.

In operation, an annotation processor 124 may be configured to utilize the metadata provided using the annotation editor 113, in conjunction with the identified server response object 112, to generate executable code (e.g., a runtime object) and generally facilitate runtime operations for the associated application feature of the mobile application 130. Also in FIG. 1, a data framework 126 is configured to execute the necessary data retrieval from an appropriate one of the server 104/database 105, the disk cache 120, or the memory cache 122. That is, as described in more detail below, the data framework 126 may be configured to consume the generated code of the annotation processor 124, either directly, or indirectly via one or more of the database 105, the disk cache 120, or the memory cache 122, depending on a current status of the mobile device 106 and other factors defined in the storage strategy of the data contract. For example, in the example of FIG. 1, the data framework 126 may be configured to receive a feature request for the application feature in question, e.g., by way of a specified request object that is provided by a data source 128 in response to the feature request received from the user using the mobile application 130.

As also illustrated in FIG. 1, the annotation processor 124 may be understood to include various sub-modules. For example, as shown, the annotation processor 124 includes a model generator 132 that is configured to generate a concrete, runtime application model to be consumed by the data framework 126 in providing the specified feature to the mobile application 130. A type adaptor 134 may be configured to enable storage of the runtime application model in either or both of the disk cache 120 or the memory cache 122. Finally in the example of FIG. 1, the annotation processor 124 is illustrated as including a deserializer 136 that is configured to transform a network or server data model of the server 104 into a format that can be utilized by a platform of the mobile device 106 and the mobile application 130, e.g., the Android platform.

Thus, the development environment 102 and associated features of the system 100 of FIG. 1 provide software developers with declarative techniques for fetching data and creating data models, including minimal use of required boilerplate when setting up a new application program interface (API) or other code. The described development techniques also enable efficient storage of application data in a manner that enables offline use of the mobile application 130, while utilizing the caches 120, 122 in a manner that is generally abstracted away from the software developers.

Furthermore, the web application 119 and the mobile application 130 may be implemented using the same, underlying data models. That is, the mobile application data model will have the same or similar structure as the web application data model, so that the mobile application 130 may be considered a mobile version of the web application 119. These goals are accomplished while minimizing a number, and maximizing a speed, of transformation operations that are required to enable the same data model structure to be used by both the web application 119 and the mobile application 130.

Figure 2:
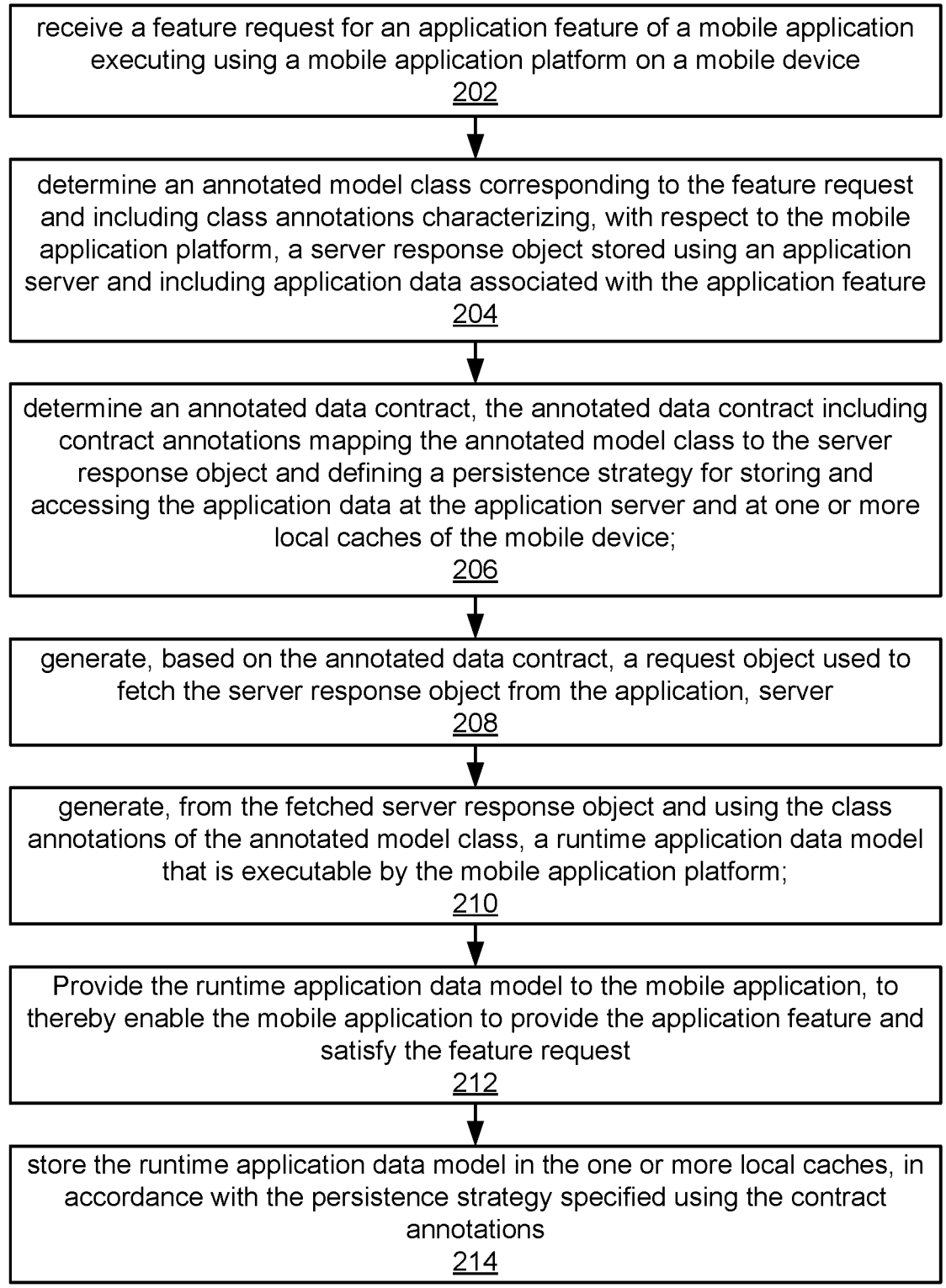
FIG. 2 is a flowchart illustrating example implementations of the system of FIG. 1.

FIG. 2 is a flowchart 200 illustrating example operations of the system 100 of FIG. 1. In the example of FIG. 2, operations 202-214 are illustrated as separate, sequential operations. However, it will be appreciated that, in alternative embodiments, additional or alternative operations or sub-operations may be included, operations may be performed in a different order than that shown, and/or one or more operations or sub-operations may be omitted. Further, it may occur that any two or more operations or sub-operations may be executed in a partially or completely overlapping or parallel manner, or in a nested, iterative, looped, or branched fashion.

In the example of FIG. 2, a feature request for an application feature of a mobile application executing using a mobile application platform on a mobile device is received (202). For example, a user of the mobile application 130 may submit a feature request for a particular application feature that has been designed and developed using the development environment 102. For example, and in the following examples, detailed implementations are provided for providing an application feature of retrieving and providing available classes (education courses) of a particular type that are available from a corresponding online education service.

An annotated model class corresponding to the feature request may be determined (204), the annotated model class including class annotations characterizing, with respect to the mobile application platform, a server response object stored using an application server and including application data associated with the application feature. For example, the annotation processor 124 may determine the annotated model class 114 defined with respect to the server response object 112.

An annotated data contract may be determined (206), the annotated data contract including contract annotations mapping the annotated model class to the server response object and defining a persistence strategy for storing and accessing the application data at the application server and at one or more local caches of the mobile device. For example, the annotation processor 124 may determine the annotated data contract 116 that was previously constructed using the development environment 102 to include contract annotations enabling retrieval of the server response object 112 and persistence thereof using the disk cache 120 and/or the memory cache 122.

Based on the annotated data contract, a request object may be generated and used to fetch the server response object from the application server (208). For example, the data source 128 may be configured to construct the request object and enable the data framework 126 to fetch the server response object 112.

Using the fetched server response object and the class annotations of the annotated model class, a runtime application data model that is executable by the mobile application platform may be generated (210). For example, the annotation processor 124 may generate the application data model 118.

The runtime application data model may be provided to the mobile application, to thereby enable the mobile application to provide the application feature and satisfy the feature request (212). For example, the data framework 126 may receive the application data model 118 from the annotation processor 124, and provide the application data model 118 to the mobile application 130 to satisfy the feature request for, e.g., the requested class listing.

The runtime application data model may then be stored in the one or more local caches, in accordance with the persistence strategy specified using the contract annotations (214). For example, more generally, the application data model 118 may be stored in accordance with the defined persistence strategy, which could include storage using one of the caches 120, 122, as well as storage using the database 105 associated with the server 104. For example, the application data model 118 may be associated with a certain expiration date, before which it may be stored using the disk cache 120, and after which it must be retrieved from the database 105, in order to ensure that the included data is sufficiently current. More generally, any expiration event(s) may be defined in the persistence strategy, such as passage of a defined amount of time, and/or any event(s) that renders the associated data invalid or out-of-date.

Figure 3:
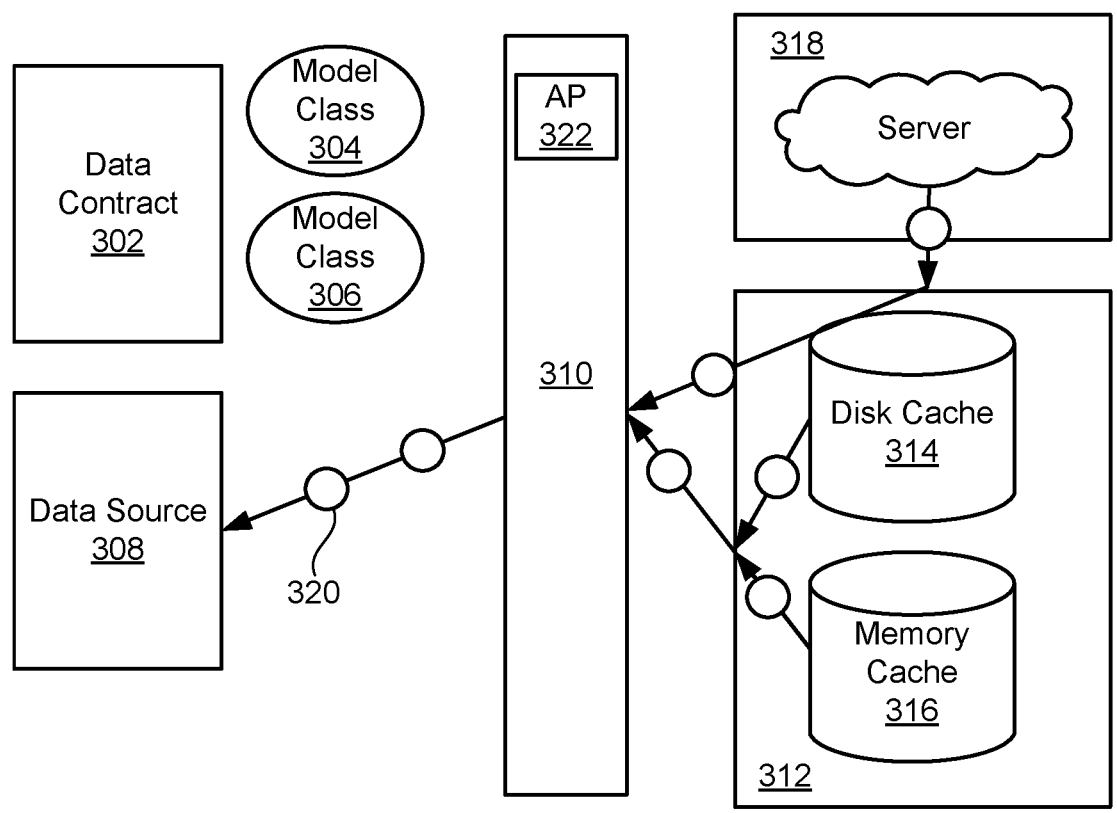
FIG. 3 is a block diagram of a system illustrating more detailed example implementation of the system of FIG. 1.

FIG. 3 is a block diagram of a system 300 illustrating more detailed example implementation of the system 100 of FIG. 1. As may be appreciated from the above description of FIGS. 1 and 2, a data contract 302, model classes 304/306, and a data source 308 all generally represent classes that a software application feature writer will implement when creating a new application program interface (API) of the software application.

As also referenced above, a data framework 310 generally represents a library capable of computing data requests using metadata of the data contract 302 and model classes 304/306 in the form of contract annotations and class annotations, respectively, to thereby obtain data from local memories 312, including a disk cache 314 and a memory cache 316, as well as from a remote network server 318. In this way, a data stream, also referred to as a reactive stream, of application data models 320 may be provided to the data source 308, and ultimately to a corresponding software application (not shown in FIG. 3).

In the following description, FIG. 3, as well as FIGS. 4-12, are described with respect to specific example implementations intended to illustrate specific techniques for implementing the system 100 of FIG. 1. It will be appreciated that such terminologies and techniques are provided as non-limiting examples, and that additional or alternative techniques for implementing the system 100 of FIG. 1 would be apparent to one of skill in the art.

Specifically, in the example of FIG. 3, the data framework 310 may be implemented using functional reactive programming techniques, such as using RxJava. As is generally known, RxJava utilizes observables and subscribers as the basic components of reactive coding, in which subscribers specify observables representing data that is provided to the subscribers when available.

By way of more specific example, an example core interaction of the data framework 310 may be represented by the method:
public <T> Observable<T> getData(DSRequest dataSourceRequest, Class<T> modelType)
Method 1

In the preceding method, as described in detail below, the term DSRequest represents request metadata, which, together with a target model class type, provides a reactive stream, or a data stream composed of the application data models 320 sourced from one or more of the caches 314, 316 and/or the server 318. As referenced above, and described in detail below, the specific source of a particular application data model will depend on configuration of the DSRequest (e.g., will depend on underlying contract annotations of the data contract 302), but in general, it will be appreciated that the application data model stored at the server 318 will be filtered out of the data stream or otherwise not used if it is found to contain the same data as the application data model available within the disk cache 314 or the memory cache 316.

Using the terminology of method 1 above, the data contract 302 may be understood to represent an interface that provides runtime objects (e.g., DSRequest) that aggregate metadata related to a feature request for an application feature. The aggregated metadata, as described herein, is provided by the feature writer using annotations (e.g., contract annotations), and describes where to find the particular runtime object or runtime application data model, as well as how to fetch the runtime object. For example, the metadata provide a uniform resource locator (URL) identifying a network location of the desired runtime object.

In the following description, the notation "@" is used to indicate specific annotations. Thus, the following represents a list of specific, potential contract annotations that may be used.

For example, @DS_contract is an example contract annotation used to instruct the resulting interface to be marked as a data contract, and to inject a corresponding host for all requests in the contract. During compilation, an annotation processor 302 generates and implementation of any class annotated with @DS_contract, and adds a postscript "signed." In general, feature writers may use this class to create contract instances.

A contract annotation @DS_path may be used to provide a path for a corresponding request. Runtime variables may be injected by creating a variable name in braces { }. Thus, @DS_path may be used as a method parameter to inject a corresponding variable.

A contract annotation @DS_persistence is used to define a persistence strategy. Accordingly, this contract annotation may be provided with a fetch strategy, e.g., to determine whether to use one or both of the caches 314, 316, as compared to the server 318. Further, an expiration strategy, such as a length of time of validity of any cached data, may be specified. In a default, example fetch strategy, if non-expired cache data exists, the network (server 318) is not used. If the cache is expired, the cache data may still be used, but is refreshed using network data, as well. For example, two responses may be returned utilizing the RxJava stream architecture.

In additional examples of contract annotations, @DS_static query/@DS_static query map may be used to define a set of key value options appended as query parameters and request. @DS_query may be used for query parameters whose values are determined at runtime, and may be used to annotate a method parameter. @DS_group may be used to associate a URL with a group. For example, one example may be "enrollment_dependencies" in an online course enrollment scenario. Specifically, a change in enrollment status may necessitate in validating all cached data for the newly enrolled course.

Using the DSRequest described above, all of the above metadata may be transferred to a runtime object that can be accessed from the signed data contract 302. As described in detail below with respect to the data source 318, it may be possible to edit any static annotation information at runtime, as the signed data contract may be constructed to return a mutable DSRequest.builder object.

In particular, the data source 308 may be used to create methods that expose the data streams created by the generated DSRequest via the data framework 310. The data source 308 may be used, as just referenced, to permit runtime edits of DSRequest objects, as well as to provide an abstraction layer or otherwise mask an implementation choice of the data framework 310. In practice, the data source 308 exposes observables created by the particular implementation choice of the data framework 310 and provides the runtime object to the requesting application.

As referenced above with respect to the annotated model class 114, the model classes 304, 306 generally represent the use of data models to model the data being utilized, including describing where the data is located within responses from the data framework 310. In the following examples, AUTO VALUE is used for data modeling. AUTO VALUE creates immutable objects, and enables the addition of generated extensions, which may be utilized, for example, to create the type adaptor 134 of FIG. 1. However, as referenced above, such techniques are provided merely by way of non-limiting examples, and other appropriate techniques may be utilized.

As referenced above, the data framework 310 itself generally represents a library configured to execute DSRequest and create observables sourced from the server 318 and the caches 314, 316. For example, a command "get data response( )" may be used to return a stream of DSResponse [model]. The resulting stream identifies everywhere that the data framework 310 searched for a specified piece of data, including cache misses, conversion errors, and network errors. A command "get data( )" may be used to return a stream of non-null model objects. Thus, this method abstracts away whether the data comes from the caches 314, 316 or the server 318. If the cache 314/316 and the server 318 contain the same information, the stream will contain only the model from the relevant cache.

The data framework 310 may be configured with a variety of caches. For example, a configuration "data framework" may be composed of a disk LRU cache, a memory LRU cache, and a network client, in which two thread schedulers are used for the cache data, and a separate thread scheduler is used for the network storage. An alternative framework "low priority data framework" may be configured from making background requests, such as pre-fetching. This framework uses low priority threads, and is limited to two concurrent network connections.

Figure 4:
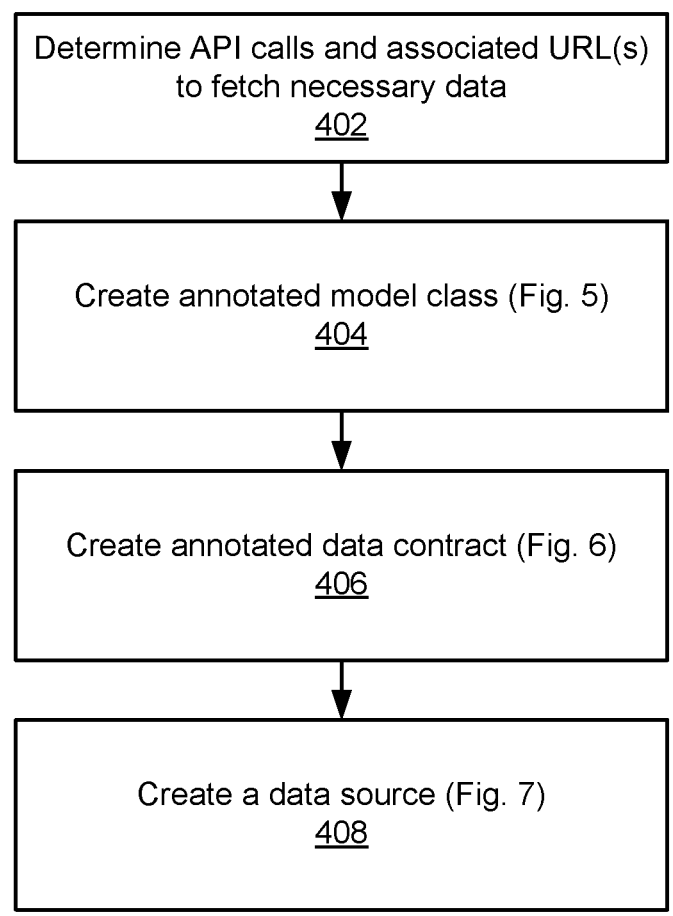
FIG. 4 is a flowchart illustrating more detailed example operations of the system of FIG. 1.

FIG. 4 is a flowchart 400 illustrating more detailed example implementations for creating the data contract 302, the model classes 304, 306 and the data source 308 of FIG. 3. More particularly, FIG. 4 is described below with respect to corresponding example screenshots of FIGS. 5-7, and with reference to development of an example application feature in which user interest recommendations are provided in the context of an online education service.

In the example of FIG. 4, it is assumed that an online education service exists, and is associated with potentially large amounts of data stored at the server 318. The online education service may be associated with an application and/or associated application features for onboarding new students, and/or for enrolling existing students in new courses. Consequently, an application feature for providing course or user interest recommendations to new or existing students may be desirable. Such a feature would generally entail, in pertinent part, retrieving relevant data from the server 318 for providing the desired user interest recommendations.

Consequently, the feature writer may initially determine appropriate API calls and any associated URL that may be necessary or helpful in fetching the necessary data (402). As referenced above with respect to FIG. 1 and the server response object 112, and described below in detail with respect to FIG. 5, the data to be fetched may be included within one or more appropriate server response objects.

The feature writer may then proceed to create an annotated model class (404). Example annotations and associated techniques for creating an annotated model class are described and illustrated below, with respect to FIG. 5.

The feature writer may also create a corresponding annotated data contract (406). Example annotations and associated, resulting data contract are illustrated below with respect to the example of FIG. 6.

Finally with respect to FIG. 4, the feature writer may proceed to create a corresponding data source (408). An example screenshot associated with creation of a data source is described and illustrated below with respect to FIG. 7.

FIG. 5 is a screenshot 500 illustrating creation of an annotated model class, in accordance with operation 404 of FIG. 4. In FIG. 5, a server response object 502 provides an example of data elements related to a user interest ID and associated results and recommendations. Linked data 504 includes linked elements. As shown, one of the linked elements 505 is also illustrated. In the example of FIG. 5, and in the following FIGS. 6-12, it is assumed that the relevant data framework is implemented as an example of the naptime.js data framework of Coursera Inc., which typically includes the type of linked elements illustrated in FIG. 5. However, other types of suitable data frameworks may be utilized.

Also in the example of FIG. 5, an annotated model class 506 is illustrated as being constructed using the server response object 502. That is, the annotated model class 506 generally mirrors the structure of the server response object 502, while including a plurality of class annotations, as described herein.

As shown, a class annotation 508 represents an AUTO VALUE annotation, and the class is identified as abstract including creating abstract accessors 510 for each field of the server response object 502, e.g., field 518. In the example of FIG. 5, the server response object 502 is expressed using java script object notation (j son), and in some implementations, a field name of the annotated model class 506 may match a corresponding j son name example. In other scenarios, a specific class annotation @serializedname 511 may be utilized to ensure correspondence.

Code section 512 illustrates a scenario in which a linked resource does not have a direct field in the name element 502 for linking purposes. Specifically, as shown, the linked element "on demand specializations" 513 does not have a direct field in the name element 502. Within the code section 512, the @serializedname class annotation is utilized and aligned 514 of code to identify the linked element 513. In these scenarios, the field may be "adopted," as shown using the bind type command in portion 515 of the code section 512.

In some scenarios, it is useful to transform a list into a map, such as and is necessary to facilitate search operations. A class annotation @naptimemap, illustrated in line 516 of the code section 512 may be implemented in this way, given an object property to key on. The various transformations illustrated by the example class annotations may be combined as needed, and is illustrated in the code section 512.

Further in FIG. 5, the linked object 504 includes a definition for user interest submission 517. Code section 518 illustrates techniques for causing the linked object to be an actual field and the annotated model class being constructed. The class annotation @naptime_include may be used to link the object automatically, while it is being parsed from j son (e.g., using GSON). In particular, the resource may be specified (520), and the manner of linking the object may also be specified (522). As shown, the class annotation @serializedname may be used in line 523 to identify the user interest ID in line 525 of the server response object 502. In this way, it is possible to specify desired resource as well as a manner of linking the specified object with the corresponding user interest object in matching the identifier, as shown in portion 524 of the annotated model class 506.

Code section 528 includes a create method, to facilitate creation of object instances for the annotated model class 506. In a code section 530, creation of a naptime deserializer is triggered. As referenced above with respect to the deserializer 136 of FIG. 1, the code section 530 results in the use of all the various class annotations of the annotated model class 506 to directly parse a json response into the desired model.

Further, when caching the model back to a disk, e.g., to disk 314, the naptime format may be dropped, and a type adaptor extension, corresponding to the type adaptor 134 of FIG. 1, may be utilized, as shown in code portion 532 of the annotated model class 506.

Figure 6:
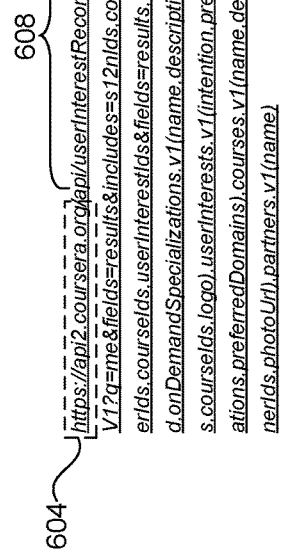
FIG. 6 is a screenshot illustrating construction of an annotated data contract in accordance with FIG. 4.

FIG. 6 is a screenshot 600 illustrating construction of an annotated data contract in accordance with operation 406 of FIG. 4. In the example of FIG. 6, an annotated data contract 601 is created which includes a class annotation 602 that identifies, among other things, a resource location 603 of a host 604.

A line 606 of the annotated data contract provides a class annotation of @DS_GET to identify a corresponding resource path 608, in this example, user interest recommendations in accordance with the annotated model class of FIG. 5.

In code portion 610, query parameters are annotated, as reflected in portion 612 of the resource path 603. As shown, if query parameters are dynamic, the contract annotation @DS_query may be used as a method parameter. To dynamically substitute path information, the contract annotation @DS_path may be used, as referenced above with respect to FIG. 3.

In line 614, contract annotations are used to define a persistence strategy. As described herein, the persistence strategy controls where the data framework 310 looks for requested data. The persistence strategy also defines the time until expiration for the cached data.

If data becomes invalid before its scheduled expiration, e.g., as a result of a user action, then cached data may be manually expired or purged. For example, as shown in line 616, a contract annotation @DS_group may be used to expire or purge all data in the cache that belongs to the specified group.

Finally with respect to FIG. 6, line 618 illustrates that a configuration change at runtime may be accommodated. Specifically, the annotated data contract of FIG. 6 is used by the annotation processor 302 to generate a builder object, and any parameter that has been set may be changed through operation of the data source 308, as described herein.

FIG. 7 is a screenshot 700 illustrating an example data source 702, in conjunction with operation 408 of FIG. 4. As shown in code section 704, the data source 702 may identify a corresponding data contract and data framework. Meanwhile, in code section 706, various example observables and associated responses are identified with respect to the corresponding data contract and data framework.

Figure 8:
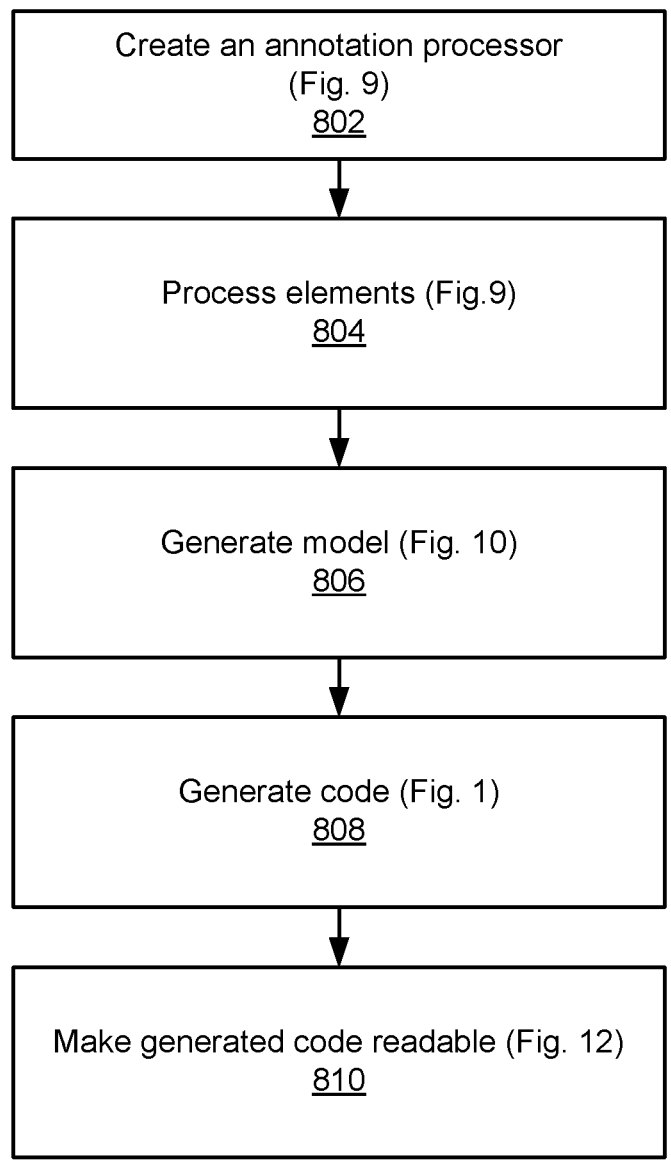
FIG. 8 is a flowchart illustrating more detailed example operations associated with operations of an annotation processor of FIGS. 3-7.

FIG. 8 is a flowchart 800 illustrating more detailed example operations associated with operations of the annotation processor 302 and associated code generation, as described and illustrated with respect to FIGS. 3-7. In the example of FIG. 8, an annotation processor is created (802), so that annotated elements may be processed (804). As referenced in FIG. 8 and illustrated and described below, FIG. 9 provides an example of an annotation processor and associated element processing.

The annotation processor 302 may then generate a corresponding model (806), as illustrated with respect to FIG. 10, and then perform code generation to obtain executable code from the generated data model (808), as illustrated with respect to FIG. 11. Finally with respect to FIG. 8, if desired, the generated code may be edited to be formatted in a more readable manner (810), as illustrated with respect to FIG. 12.

As referenced above, FIG. 9 illustrates a screenshot 900 illustrating code for creating an annotation processor 902. As shown in code section 904, supported annotation types are provided, including the contract annotation @DS_contract to define the annotated data contract to be processed. As shown in code section 906, each DS contract class is processed. As shown in code section 908, each of the DS contracts is fulfilled by generating corresponding files.

FIG. 10 is a screenshot 1000 illustrating code 1002 for utilizing the annotation processor of FIG. 9 to generate a data model corresponding to the parsed, annotated data contract. As shown, the example of FIG. 10 illustrates and includes a number of the aspects described above, including, e.g., the query path, query maps, response types, and persistence strategy.

FIG. 11 is a screenshot 1100 illustrating code for generating executable code using the annotation processor of FIG. 9. As shown, for example, in code portion 1104, the annotation processing and associated code generation of FIG. 11 results in production of a string, where the resulting string is constructed as a valid java file.

FIG. 12 illustrates a screenshot 1200 demonstrating edited code 1202 that results from the code generation process of FIG. 11, and includes edits 1204, 1206, as well as other edits added by the feature writer to make the code more readable. For example, such readability may be advantageous to the feature writer at a later time, or may be useful to another feature writer wishing to leverage the work done to produce the generated code of FIGS. 11 and 12, e.g., in conjunction with a later feature being developed.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
    receive a feature request for an application feature of a mobile application executing using a mobile application platform on a mobile device;
    determine, in response to the feature request, an annotated model class corresponding to the feature request and including class annotations, the annotated model class mirroring a server response object stored using an application server and including application data associated with the application feature, wherein the server response object is used by a web application at the application server to obtain the application data, and further wherein the annotated model class mirrors the server response object in that the class annotations link fields of the annotated model class with fields of the server response object, using abstract accessors;
    determine an annotated data contract, the annotated data contract including contract annotations and providing an interface that maps the annotated model class to the server response object, including defining a persistence strategy for accessing the application data at the application server when network access is available, and for formatting and storing the application data for offline access when the network access is not available, using one or more local caches of the mobile device;
    generate, based on the annotated data contract and on the feature request, a request object that identifies the server response object and is used to fetch the server response object from the application server; and
    generate, including accessing the fields of the server response object using the class annotations, a runtime application data model that is executable by the mobile application platform to provide the application data for the application feature, in response to the feature request, using the fetched server response object.

2. The computer program product of claim 1, wherein the instructions, when executed, are further configured to:
    store the runtime application data model in the one or more local caches, in accordance with the persistence strategy specified using the contract annotations.

3. The computer program product of claim 2, wherein the one or more local caches includes at least a disk cache and a memory cache, and wherein the instructions, when executed, are further configured to:
    execute the persistence strategy including selecting between the disk cache and the memory cache when storing the application data model.

4. The computer program product of claim 2, wherein the instructions, when executed, are further configured to:
    expire the application data model from the one or more local caches after an expiration event defined in the persistence strategy.

5. The computer program product of claim 1, wherein the instructions, when executed, are further configured to:
    provide the generated request object to a data framework, which is configured to determine a memory from which the application data model should be fetched, from among the application server and the one or more local caches, and thereafter execute the fetching therefrom.

6. The computer program product of claim 1, wherein the annotated data contract includes a uniform resource locator (URL) at which the server response object may be fetched from the application server.

7. A method comprising:
    receiving a feature request for an application feature of a mobile application executing using a mobile application platform on a mobile device;
    determining, in response to the feature request, an annotated model class corresponding to the feature request and including class annotations, the annotated model class mirroring a server response object stored using an application server and including application data associated with the application feature, wherein the server response object is used by a web application at the application server to obtain the application data, and further wherein the annotated model class mirrors the server response object in that the class annotations link fields of the annotated model class with fields of the server response object, using abstract accessors;

determining an annotated data contract, the annotated data contract including contract annotations and providing an interface that maps the annotated model class to the server response object, including defining a persistence strategy for accessing the application data at the application server when network access is available, and for formatting and storing the application data for offline access when the network access is not available, using one or more local caches of the mobile device;

generating, based on the annotated data contract and on the feature request, a request object that identifies the server response object and is used to fetch the server response object from the application server; and generating, including accessing the fields of the server response object using the class annotations, a runtime application data model that is executable by the mobile application platform to provide the application data for the application feature, in response to the feature request, using the fetched server response object.

8. The method of claim 7, further comprising:
storing the runtime application data model in the one or more local caches, in accordance with the persistence strategy specified using the contract annotations.

9. The method of claim 8, further comprising:
transforming a format of the application data model for storage in the one or more local caches.

10. The method of claim 8, wherein the one or more local caches includes at least a disk cache and a memory cache, and wherein the method further comprises:
executing the persistence strategy including selecting between the disk cache and the memory cache when storing the application data model.

11. The method of claim 8, further comprising:
expiring the application data model from the one or more local caches after an expiration event defined in the persistence strategy.

12. The method of claim 7, further comprising:
providing the generated request object to a data framework, which is configured to determine a memory from which the application data model should be fetched, from among the application server and the one or more local caches, and thereafter execute the fetching therefrom.

13. The method of claim 7, wherein the annotated data contract includes a uniform resource locator (URL) at which the server response object may be fetched from the application server.

14. A computer program product, the computer program product being tangibly embodied on a non-transitory computer-readable storage medium and comprising instructions that, when executed, are configured to cause at least one computing device to:

receive a feature request for an application feature of a mobile application executing using a mobile application platform on a mobile device;

determine, in response to the feature request, an annotated model class corresponding to the feature request and including class annotations, the annotated model class mirroring a server response object stored using an application server and including application data associated with the application feature, wherein the server response object is used by a web application at the application server to obtain the application data, and further wherein the annotated model class mirrors the server response object in that the class annotations link fields of the annotated model class with fields of the server response object, using abstract accessors;

determine an annotated data contract, the annotated data contract including contract annotations and providing an interface that maps the annotated model class to the server response object, including defining a persistence strategy for accessing the application data at the application server when network access is available, and for formatting and storing the application data for offline access when the network access is not available, using one or more local caches of the mobile device;

generate, based on the annotated data contract and on the feature request, a request object that identifies the network address of the server response object and is used to fetch the server response object from the application server;

generate, including accessing the fields of the server response object using the class annotations, a runtime application data model that is executable by the mobile application platform to provide the application data for the application feature, in response to the feature request, using the fetched server response object; and store the runtime application data model in the one or more local caches, in accordance with the persistence strategy specified using the contract annotations.

15. The computer program product of claim 14, wherein the one or more local caches includes at least a disk cache and a memory cache, and wherein the instructions, when executed, are further configured to:
execute the persistence strategy including selecting between the disk cache and the memory cache when storing the application data model.

16. The computer program product of claim 14, wherein the instructions, when executed, are further configured to:
expire the application data model from the one or more local caches after an expiration event defined in the persistence strategy.

* * * * *